Patented Feb. 11, 1941

2,231,706

UNITED STATES PATENT OFFICE 2,231,706

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application September 19, 1939,
Serial No. 295,649

6 Claims. (Cl. 260—206)

This invention relates to azo compounds and to fibrous organic derivatives of cellulose colored therewith. More particularly it relates to azo compounds having the general formula:

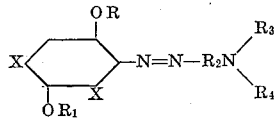

wherein one X represents a nitro group, and the other X represents a member selected from the group consisting of halogen, a hydroxyl group, an alkyl group, a sulfone alkyl group, a sulfonamide group, a carboxyl group, a carboxylic organic ester group, and a nitro group, R and $R_1$ each represents a member selected from the group consisting of an alkyl group, and a phenyl group, $R_2$ represents a member selected from the group consisting of a benzene nucleus, and a naphthalene nucleus, and $R_3$ and $R_4$ each represents a member selected from the group consisting of hydrogen, an alkyl group, a hydroxyalkyl group, a sulfatoethyl group, a sulfoethyl group, a phosphoethyl group, and a phenyl group. When R and $R_1$ represent alkyl groups, they may be substituted further by hydroxyl, alkoxy, sulpho, and sulfato groups, and when R and $R_1$ represent phenyl groups, they may likewise be further substituted by halogen, or by alkyl, alkoxy, and nitro groups.

I am aware that azo compounds have been prepared heretofore with the diazo salts of certain 2,5-dialkoxy (or diphenoxy) anilines, but it is my experience with compounds of this type that they have the disadvantage of being phototropic, which is particularly true for the yellow and light orange colored species of such dyes. My azo dye compounds, on the contrary, are not phototropic. Furthermore, they possess a relatively higher rate of coloring cellulose acetate materials.

It is an object of my invention, therefore, to prepare the class of azo compounds above described, and to color cellulose organic derivatives, particularly cellulose acetate, in the form of threads, yarns, fibers, and fabric materials therewith.

The azo compounds of the invention may be prepared by coupling various suitable heterocyclic compounds and arylamines with the diazo salts of amines having the following general formula:

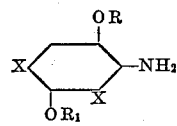

wherein R, $R_1$, and each X have the meanings previously defined.

The intermediates represented by the above general formula may be obtained by nitrating a 3,6-dialkoxy aniline, or a 3,6-diphenoxyaniline, or a 3-alkoxy-6-phenoxyaniline, or a 3-phenoxy-6-alkoxyaniline which are further substituted in each case in either the 2 or 4 position by a monovalent substituent selected from the group consisting of halogen, a hydroxyl group, an alkyl group, a sulfonalkyl group, a sulfonamide group, a carboxyl group, a carboxylic organic ester group, and a nitro group.

The following examples illustrate the preparation of some of the azo compounds of my invention.

Example 1

1 mole of 2-chloro-3,6-di-β-methoxyethoxy-4-nitroaniline is suspended in 2000 c.cs. of water with 300 c.cs. of hydrochloric acid and diazotized at 20° C., with 1 mole of sodium nitrite. This solution is then coupled with 1 mole of the sodium salt of β-sulfoethyl diphenylamine in water, in the presence of sodium acetate. When the coupling reaction is complete, the dye is salted out, filtered and dried. Cellulose acetate is colored rubine shades from an aqueous solution or suspension of the dye, which may contain salt.

The azo compound obtained has the formula:

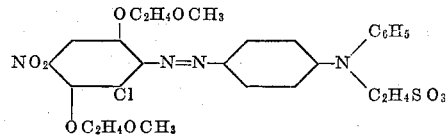

Example 2

1 mole of 2-hydroxy-3,6-diphenoxy-4-nitroaniline is suspended in 2000 c.cs. of water with 300 c.cs. of hydrochloric acid, diazotized with 1 mole of sodium nitrite at 20° C., and the solution added with stirring to 1 mole of the sodium salt of β-sulfatoethyl butylaniline dissolved in ice water. Concurrently with the addition of the diazo solution there is added a solution of sodium bicarbonate at a rate just sufficient to maintain a slight acidity of the mixture as indicated by Congo red paper. When the reaction is complete, the dye is salted out, filtered and dried. Cellulose acetate is colored pinkish-red shades from an aqueous solution or suspension of the dye which may contain salt.

The azo compound obtained has the formula:

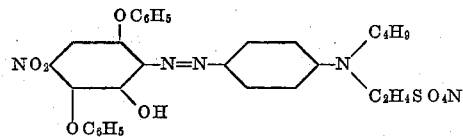

Example 3

1 mole of 2-chloro-3-methoxy-6-phenoxy-4- nitroaniline is diazotized as in the preceding examples and added with cooling to a mixture of ice and water containing hydrochloric acid and 1 mole of di-glycerylcresidine. After a short time, the mixture is made neutral to Congo red with sodium acetate, and when the coupling reaction is complete, the dye is filtered off, washed and dried. Cellulose acetate is colored rubine shades from an aqueous suspension of the dye.

The azo compound obtained has the formula:

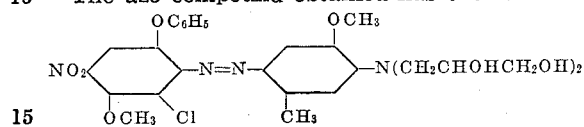

Example 4

(A) 1 mole of 2,4-dinitro-3-methoxy-6-β-sodium sulfoethoxy-aniline is dissolved in 2500 c.cs. of warm acetic acid and cooled to room temperature.

(B) 76 grams of sodium nitrite are dissolved in 530 c.cs. of sulfuric acid, followed by warming the solution to 70° C., and then cooling to 10–15° C.

The diazotization is accomplished by slowly adding solution (A) to (B) over a period of 30 minutes, meanwhile maintaining a temperature of 10–15° C. After the addition, the resulting mixture is stirred at room temperature until the reaction is complete, after which there is added 10 grams of urea to remove any nitrous acid liberated by the process. 1 mole of glyceryl-α-naphthylamine is dissolved in cold acetic acid, and the diazo solution above described is added slowly with stirring. Concurrently with the addition of the diazo solution there is added a solution of sodium acetate in acetic acid at such a rate that the mixture remains just acid to Congo red indicator. When the reaction is complete, water is added, and the dye is filtered off, washed and dried. Cellulose acetate is colored purple shades from an aqueous solution or suspension of the dye which may contain salt.

The azo compound obtained has the formula:

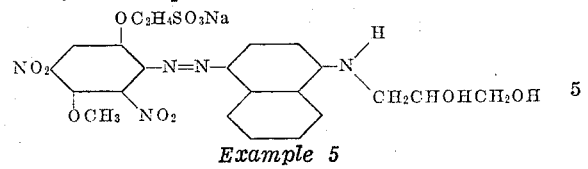

Example 5

1 mole of 2-amino-3,6-dimethoxy-5-nitro-phenylmethylsulfone is diazotized and added to a well iced hydrochloric acid solution of glyceryl cresidine. The coupling reaction is completed by adding sodium acetate, after which the dye is filtered off, washed and dried. Cellulose acetate is colored red shades from an aqueous suspension of the dye.

The azo compound obtained has the formula:

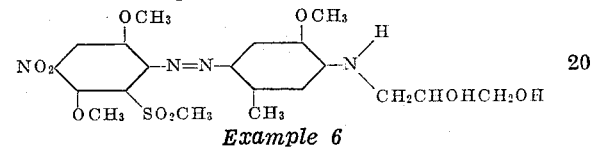

Example 6

1 mole of 2-amino-3,6-dimethoxy-5-nitrophenyl sulfon-ethylamide is diazotized and coupled in the usual manner with 1 mole of 2-methoxy-5-acetamino glycerylaniline, the resulting dye coloring cellulose acetate blue shades from an aqueous suspension of the dye.

The azo compound has the formula:

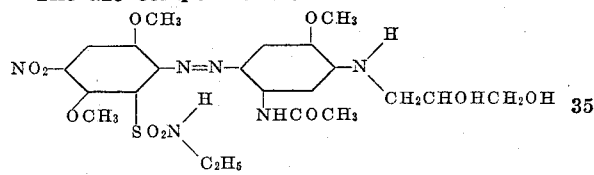

In order that the scope of my invention will be more fully apparent, I am disclosing in the following table a number of additional examples of suitable diazotization and coupling components, the dyes resulting therefrom coloring cellulose acetate fibers the colors designated.

| Diazotization components | Coupling components | Shade on cellulose acetate |
|---|---|---|
| 2-halo-3,6-dialkoxy (or diphenoxy)-4-nitroaniline | 1. 5,5-dimethyl dihydroresorcinol | Yellow. |
| Do | 2. 5-methyl dihydroresorcinol | Do. |
| Do | 3. 4-methyl dihydroresorcinol | Do. |
| Do | 4. Barbituric acid | Do. |
| Do | 5. 3-methyl-5-pyrazolone | Do. |
| Do | 6. p-Cresol | Do. |
| Do | 7. Dimethylaniline | Red. |
| Do | 8. Dihphenylamine | Do. |
| Do | 9. m-Anisidine | Orange. |
| Do | 10. Di-hydroxyalkylaniline | Red. |
| Do | 11. Alkalylhydroxyalkylanilines | Do. |
| Do | 12. Di-hydroxyalkylcresidines | Rubine. |
| Do | 13. Di-hydroxyalkyliso-cresidines | Do. |
| Do | 14. Butyl-β-sulfoethylaniline | Do. |
| Do | 15. Butyl-β-sulfatoethylaniline | Do. |
| Do | 16. Butylglycerylaniline | Do. |
| Do | 17. Butyl-β-phosphoethylaniline | Do. |
| 2-nitro-4-halo-3,6-dialkoxy (or diphenoxy) anilines | Couplers 1–6 | Yellow. |
| Do | Couplers 7–8 | Orange. |
| Do | Coupler 9 | Yellow. |
| Do | Couplers 10–17 | Orange. |
| 2-sulfonalkyl-4-nitro-3,6-dialkoxy (or diphenoxy) anilines | Couplers 1–6 | Yellow. |
| Do | Couplers 7–8 | Rubine. |
| Do | Coupler 9 | Orange-red. |
| Do | Couplers 10–17 | Rubine. |
| 2-hydroxy-4-nitro-3,6-dialkoxy (or diphenoxy) anilines | Couplers 1–6 | Yellow. |
| Do | Couplers 7–8 | Red. |
| Do | Coupler 9 | Orange. |
| Do | Couplers 10–17 | Red. |
| 2,4-dinitro-3,6-dialkoxy (or diphenoxy) anilines | Couplers 1–6 | Yellow. |
| Do | Couplers 7–8 | Purple. |
| Do | Coupler 9 | Red. |
| Do | Couplers 10–11 | Purple. |
| Do | Couplers 12–13 | Blue (red tint). |
| Do | Couplers 14–17 | Purple. |
| Do | Glyceryl-α-naphthylamine | Do. |
| Do | 1-β-hydroxyethylamino-5-naphthol | Blue. |
| Do | 5-methyl-N-glyceryl tetrahydroquinoline | Do. |

The terms halo, phenoxy, alkoxy, alkyl, and hydroxyalkyl are intended to mean wherever used in the specification and claims, unless otherwise specified, atoms such as chlorine, bromine, fluorine, and radicals such as phenoxy, halo substituted phenoxy, nitro substituted phenoxy, alkyl substituted phenoxy, methoxy, ethoxy, propoxy, butoxy, hydroxyethoxy, sulfoethoxy, sulfatoethoxy, alkoxyethoxy, methyl, ethyl, butyl, cetyl, β-hydroxyethyl, β-hydroxypropyl, γ-hydroxypropyl, ω-hydroxybutyl, β,γ-dihydroxypropyl, sulphuric and phosphoric acid esters of the hydroxyalkyl groups, sulfoalkyls, and other similar kinds of radicals.

In the application of the azo compounds of my invention to the coloration of organic derivatives of cellulose, particularly cellulose acetate, the dye compound may be formed directly on the fiber by diazotizing the desired amine and coupling with the desired developer in situ, or the dye compound may first be prepared in the manner above described and then applied to the material to be colored from an aqueous solution or suspension of the dye. In general, the azo dye compounds of the invention will be applied from a dispersion of the dye which may be prepared by grinding the dye compound to a paste in the presence of a dispersing agent such as a soap, a sulfonated oil, or a higher fatty acid glyceryl sulfate, and then dispersing the paste in a suitable quantity of water. The material to be colored is immersed in the dispersion starting with a bath temperature of approximately 45–55° C., which is then gradually increased to a maximum of 80–85° C. During the dyeing operation, salt may be added to the bath to facilitate exhaustion of the dye. After a period of about 3 hours, it will be found that the material has acquired the desired depth of color, when it is removed from the bath, washed with soap, rinsed and dried. Where the particular dye compound is water-soluble it is possible to apply it directly from an aqueous solution without the necessity of employing a dispersing or solubilizing agent.

While my invention is illustrated more particularly in connection with cellulose acetate, a material to which the invention is especially adapted, it will be understood that the azo dye compounds above described are by no means limited exclusively to cellulose acetate, but are likewise of value for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and cellulose ethers such as methyl cellulose, ethyl cellulose, and benzyl cellulose.

I claim:

1. The azo compounds having the general formula:

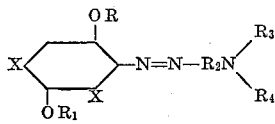

wherein one X represents a nitro group, and the other X represents a member selected from the group consisting of a halogen, a hydroxyl group, an alkyl group, a sulfonalkyl group, a sulfonamide group, a carboxyl group, and a nitro group, R and $R_1$ each represents a member selected from the group consisting of an alkyl group, and a phenyl group, $R_2$ represents a member selected from the group consisting of a benzene nucleus, and a naphthalene nucleus, and $R_3$ and $R_4$ each represents a member selected from the group consisting of hydrogen, an alkyl group, a hydroxyalkyl group, and a phenyl group.

2. The azo compounds having the general formula:

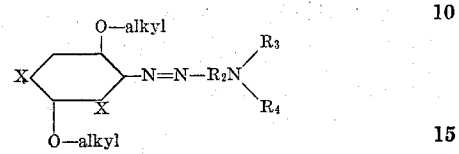

wherein one X represents a nitro group, and the other X represents a member selected from the group consisting of a halogen, a hydroxyl group, an alkyl group, a sulfonalkyl group, a sulfonamide group, a carboxyl group, and a nitro group, $R_2$ represents a member selected from the group consisting of a benzene nucleus, and a naphthalene nucleus, and $R_3$ and $R_4$ each represents a member selected from the group consisting of hydrogen, an alkyl group, a hydroxyalkyl group, and a phenyl group.

3. The azo compounds having the general formula:

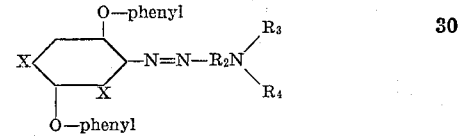

wherein one X represents a nitro group, and the other X represents a member selected from the group consisting of a halogen, a hydroxyl group, an alkyl group, a sulfonalkyl group, a sulfonamide group, a carboxyl group, and a nitro group, $R_2$ represents a benzene nucleus, and $R_3$ and $R_4$ each represents a member selected from the group consisting of hydrogen, an alkyl group, a hydroxyalkyl group, and a phenyl group.

4. The azo compounds having the general formula:

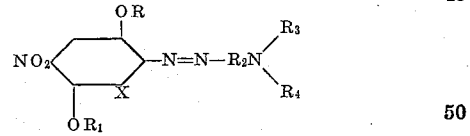

wherein X represents a member selected from the group consisting of a halogen, a hydroxyl group, an alkyl group, a sulfonalkyl group, a sulfonamide group, a carboxyl group, and a nitro group, R and $R_1$ each represents a member selected from the group consisting of an alkyl group, and a phenyl group, $R_2$ represents a benzene nucleus, and $R_3$ and $R_4$ each represents a member selected from the group consisting of hydrogen, an alkyl group, a hydroxyalkyl group, and a phenyl group.

5. Material made of or containing an organic derivative of cellulose colored with a dye selected from the class of non-sulfonated nuclear azo compounds having the general formula:

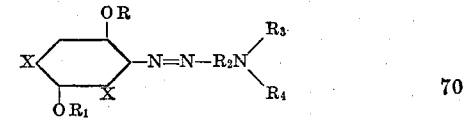

wherein one X represents a nitro group, and the other X represents a member selected from the group consisting of a halogen, a hydroxyl group, an alkyl group, a sulfonalkyl group, a sulfonamide group, a carboxyl group, and a nitro group, R and R₁ each represents a member selected from the group consisting of an alkyl group, and a phenyl group, R₂ represents a member selected from the group consisting of a benzene nucleus, and a naphthalene nucleus, and R₃ and R₄ each represents a member selected from the group consisting of hydrogen, an alkyl group, a hydroxyalkyl group, and a phenyl group.

6. Material made of or containing cellulose acetate colored with a dye selected from the class of non-sulfonated nuclear azo compounds having the general formula:

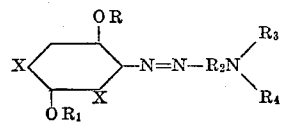

wherein one X represents a nitro group, and the other X represents a member selected from the group consisting of a halogen, a hydroxyl group, an alkyl group, a sulfonalkyl group, a sulfonamide group, a carboxyl group, and a nitro group, R and R₁ each represents a member selected from the group consisting of an alkyl group, and a phenyl group, R₂ represents a member selected from the group consisting of a benzene nucleus, and a naphthalene nucleus, and R₃ and R₄ each represents a member selected from the group consisting of hydrogen, an alkyl group, a hydroxyalkyl group, and a phenyl group.

JOSEPH B. DICKEY.